United States Patent [19]
Kwan et al.

[11] Patent Number: 5,974,031
[45] Date of Patent: Oct. 26, 1999

[54] AUTOMATIC DETECTION OF A TELECOMMUNICATIONS FRACTIONAL CHANNEL CONFIGURATION

[75] Inventors: Michael D Kwan, Camas, Wash.; Allan W Dodge, Colorado Springs, Colo.

[73] Assignee: Hewlett-Packard Company, Palo Alto, Calif.

[21] Appl. No.: 08/791,792

[22] Filed: Jan. 29, 1997

Related U.S. Application Data

[63] Continuation-in-part of application No. 08/548,164, Oct. 25, 1995, Pat. No. 5,627,820.

[51] Int. Cl.$^6$ ....................................................... H04J 3/14
[52] U.S. Cl. .......................... 370/252; 370/433; 375/224; 375/260
[58] Field of Search ..................................... 370/241, 244, 370/251, 252, 431, 433, 437, 458, 459, 468, 535, 520, 537, 541; 395/235, 260; 375/224, 260

[56] References Cited

U.S. PATENT DOCUMENTS

| | | | |
|---|---|---|---|
| 5,065,396 | 11/1991 | Castellano et al. | 370/84 |
| 5,072,449 | 12/1991 | Enns et al. | 370/474 |
| 5,115,431 | 5/1992 | Williams et al. | 370/394 |
| 5,311,456 | 5/1994 | Chiang et al. | 364/715.11 |
| 5,457,715 | 10/1995 | Sakaki et al. | 375/260 |
| 5,619,500 | 4/1997 | Hiekali | 370/414 |
| 5,627,820 | 5/1997 | Kwan | 370/252 |

Primary Examiner—Chau Nguyen
Assistant Examiner—Soon-Dong Hyun
Attorney, Agent, or Firm—Augustus W. Winfield

[57] ABSTRACT

A method of detecting fractional channels in a telecommunications circuit. A non-idle data rate is measured for each channel in the telecommunications circuit. Channels having matching non-idle data rates are grouped into sets. Non-idle data rates are measured again for the channels within each set. In each set, any channels having non-matching non-idle data rates (with a small predetermined range of permissible variability) are eliminated. The measurement for each set is repeated multiple times. Each remaining set has channels that have substantially identical non-idle data rates over multiple time periods and each remaining set is assumed to constitute a fractional channel. Non-idle data rates are measured by counting non-idle octets over a fixed period of time, or by measuring throughput (non-idle octets per second) or by measuring utilization (throughput/capacity). In an alternative embodiment, idle flags or shifted idle flags for non-encrypted HDLC or SDLC protocols are used to identify provisional sets of channels. In still another embodiment, channels identified as voice channels are removed from provisional sets.

5 Claims, 2 Drawing Sheets

AUTOMATIC DETECTION OF A TELECOMMUNICATIONS FRACTIONAL CHANNEL CONFIGURATION

This is a continuation-in-part of application Ser. No. 08/548,164, filed Oct. 25, 1995 now U.S. Pat. No. 5,627,820.

FIELD OF INVENTION

This invention relates generally to digital telephony and more specifically to detection of configuration information that is useful for instrumentation used for telecommunications problem diagnosis and performance monitoring

BACKGROUND OF THE INVENTION

Digital transmission systems typically carry multiple time division multiplexed channels. For example, the T-1 (or T1) system commonly used in the United States and Canada can handle 24 simultaneous voice conversations (or data equivalents). The European counterpart (E-1 or E1) can carry 31 channels. Although digital telecommunications lines may be used for any digital data, the basic specifications originate from the requirements for digitized voice. Digitization of analog voice requires 8,000 samples per second to satisfy the Nyquist criteria of twice the highest voice frequency of 4,000 Hz. Coding each sample into 8-bits (called octets in the telecommunication industry) results in the fundamental digital voice channel rate of 64 kbps (thousand bits per second). As a result, for T1 and E1 digital telephone circuits, each channel has a bandwidth of 64 kbps, formatted as 8,000 octets per second.

Multiple channels can be concatenated together to form a single higher-rate channel referred to as a fractional T1 (or E1) channel. For example, two channels can be combined to make a single 128 kbps channel. In general, during troubleshooting or performance monitoring, which channels and how many channels are combined to make these fractional channels may not be known. There is a need for automatic determination of how many fractional channels exist on a circuit and which channels are combined into each fractional channel. There is also a need for identification of the type of traffic that is present on each fractional channel.

SUMMARY OF THE INVENTION

The non-idle data rate for each channel is analyzed. Successive multiple measurements are analyzed. Channels that make up a fractional channel have matching non-idle data rates, within a small error, over successive multiple measurements. Channels having matching non-idle data rates are grouped into sets. Non-idle data rates are measured multiple times for the channels within each set. In each set, any channels having non-matching non-idle data rates (with a small predetermined range of permissible variability) are eliminated. Voice channels have additional unique characteristics and channels identified as voice channels are removed from provisional sets. Voice channels are also separately identified. Each remaining set having at least two channels that have substantially identical non-idle data rates over multiple time periods is assumed to constitute a fractional channel. Non-idle data rates may be measured by counting octets, throughput, utilization or other similar measurements. In alternative embodiment, shifted idle flags for non-encrypted HDLC or SDLC protocols are used to identify provisional sets of channels. Non-encrypted HDLC or SDLC channels are also separately identified.

DETAILED DESCRIPTION OF THE PREFERRED EMBODIMENT OF THE INVENTION

Figure 1A:
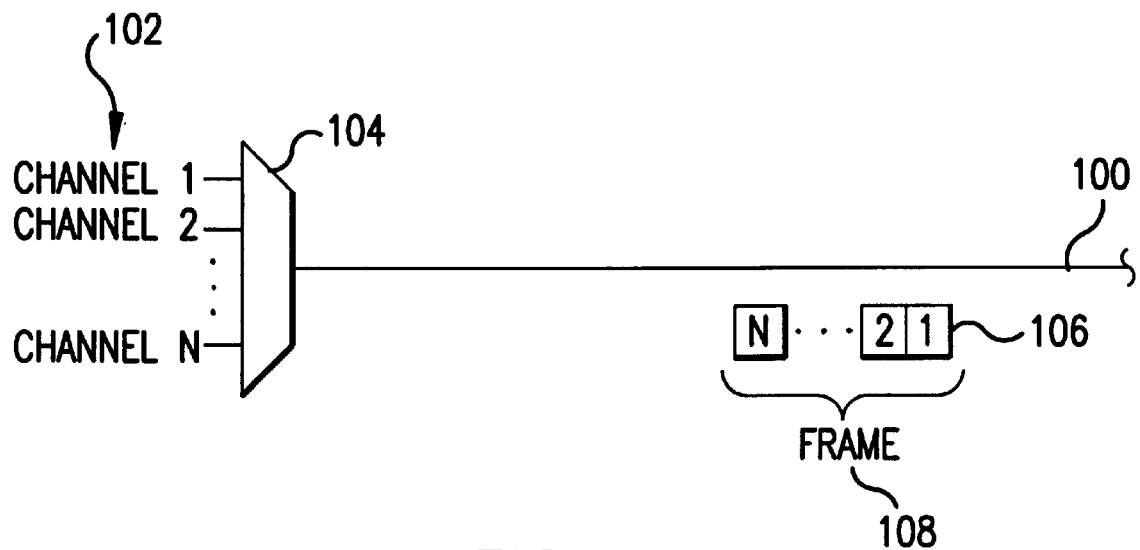
FIG. 1A is a block diagram of a multiple channel digital telecommunications circuit.

FIG. 1A is a block diagram of a digital time division multiplexed telecommunication circuit. A transmission line 1E serially carries N channels 102 of data. Each channel 102 is multiplexed by multiplexer 104. A sample from one channel is an octet 106. N octets constitute a frame 108. The frame rate for T1 and E1 circuits is 8,000 frames per second, each frame carrying one octet per channel, each channel therefore having a bandwidth of 8,000 octets per second.

Figure 1B:
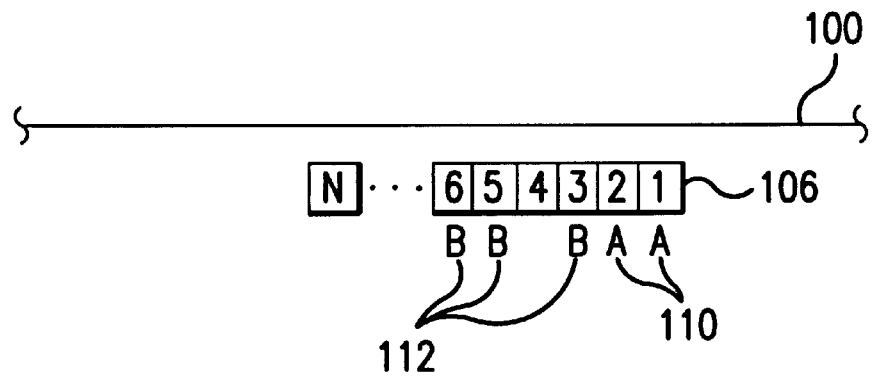
FIG. 1B is the circuit of FIG. 1A with multiple fractional circuits.

FIG. 1B illustrates the transmission line 100 of FIG. 1A and octets 106 with some octets logically combined into higher speed channels. The numbers in the octets 106 represent channel numbers as depicted by reference number 102 in FIG. 1A. The letters below the octets designate fractional (or high speed) channels. Channels 1 and 2 are combined to form fractional channel A with a bandwidth of 128 kbps. Channels 3, 5 and 6 are combined to form fractional channel B with a bandwidth of 192 kbps. Note that channels forming a fractional channel are not necessarily contiguous. In general, a person monitoring transmission line 100 may not know that channels 1 and 2 are combined and that channels 3, 5 and 6 are combined. This information is necessary for troubleshooting and analysis of fractional channels.

Typically, a channel or fractional channel is not used continuously. There will be bursts of activity separated by idle periods. There is a standard 8-bit pattern for an octet signifying that a channel is idle. In general, non-idle activity varies with time. Within the set of channels in a fractional channel, however, non-idle activity varies substantially identically over time for every channel in the set. Therefore, a way to determine if channels are combined is to examine statistics for non-idle activity of each channel over time and determine which channels have substantially identical statistics over time.

Figure 2:
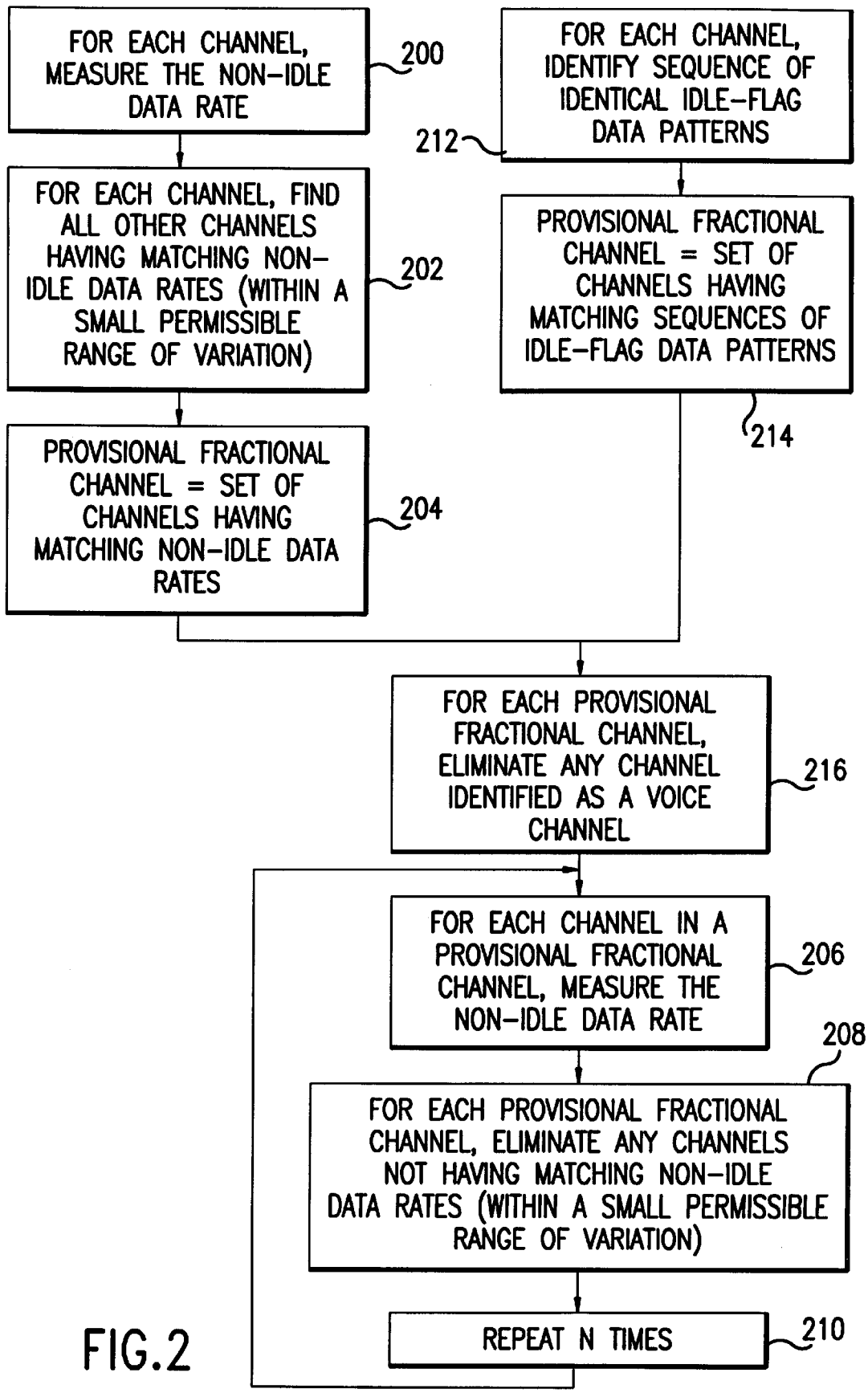
FIG. 2 is a flow chart of the method used to determine channel configuration.

FIG. 2 is a flow chart illustrating an embodiment of a method in accordance with the invention. First, in step 200, the non-idle data rate for each channel is computed. In step 202, the non-idle data rate for each channel is compared to the non-idle data rate for every other channel. Channels having the same non-idle data rate, plus or minus a small permissible variation, are grouped into sets (step 204). Each set is provisionally a fractional channel, subject to further refinement over time. During each iteration of steps 206–210, non-idle data rates are measured for each channel within each provisional fractional channel. In step 208, within each provisional fractional channel, any channels not having the same non-idle data rate, plus or minus a small permissible variation, are eliminated from the set. After N iterations of steps 206–210, each provisional fractional channel having more than one channel remaining has a set of channels that have had matching non-idle data rates during N different time intervals. Therefore, each remaining provisional channel having at least two channels is assumed to constitute a fractional channel.

In a specific application, non-idle octets are counted over a fixed time interval. The fixed time interval is one second, N is ten, and the permissible variation is plus or minus 25 counts. Alternative related non-idle data rate measurements may be used depending on what is normally provided by instrumentation. For example, an instrument may measure throughput (octets per second) which may or may not require a fixed period of time. Alternatively, an instrument may measure utilization (throughput/capacity) expressed as a percentage. Note that any one of (a) counts over a fixed time interval, (b) throughput and (c) utilization may be calculated from any of the other related measurements.

Two common data protocols of particular interest are the High level Data Link Control (HDLC) protocol, developed by the International Standards Organization and the Synchronous Data Link Control (SDLC), developed by IBM. Identification of a channel or fractional channel as HDLC or SDLC is useful in telecommunications instrumentation. In addition, as discussed below, idle characteristics of HDLC and SDLC channels are useful for identifying provisional fractional channels. HDLC and SDLC are bit-oriented synchronous communications protocols. In each, data bit patterns may be modified to distinguish data from control characters. In particular, if a byte of data contains more than 5 consecutive logical ones, a logical zero is inserted. In telecommunications, the standard 8-bit idle flag is hexadecimal "7E" (01111110). Within HDLC or SDLC traffic, idle characters are unique in that they have six consecutive ones. However, insertion of a zero within a run of ones in a data byte shifts idle character boundaries as well as data boundaries. For example, if a data byte containing more than five ones is followed by a series of idle flags, the extra zero inserted into the data byte shifts part of the data byte into the next octet for that channel (the first of a series of idle flags), forcing part of the first idle flag to be partially shifted into a subsequent octet, and in turn forcing each of the remaining idle flags in the series to be partially shifted into subsequent octets. As discussed above, the octets containing the idle flags may not be contiguous. In a long sequence of octets of idle flags or shifted idle flags, each octet in the sequence may assume one of eight values or phases, depending on where the idle flag boundary falls within each octet, as follows: 7E, FC, F9, F3, E7, CF, 9F, 3F. Therefore, an identifying characteristic of HDLC or SDLC protocols is a run of identical consecutive octets, each containing one of the eight possible phases of an idle flag. In a fractional channel concatenating data from one HDLC or SDLC channel, every channel in the fractional channel set will have idle flags shifted to the same phase. Therefore, idle flag patterns may be used to separately identify HDLC and SDLC channels. In addition, channels having identically shifted idle flags may be grouped into a provisional fractional channel. That is, in addition to using non-idle data rates for provisional channels, idle flag patterns may also be used to identify candidates for a provisional channel (FIG. 2, 212, 214). Note that encryption may occur after data has been formatted into HDLC or SDLC protocols. As a result, idle flags may not be detectable in encrypted data.

In telecommunications instrumentation, it is also useful to identify voice channels. In general, voice channels are not concatenated into fractional channels. Therefore, an additional way to eliminate inappropriate channels from a provisional set is to identify any voice channels within a provisional set (FIG. 2, 216). Voice data may include an occasional "7E" (data idle flag) pattern, but voice also contains many values that have more than five consecutive logical ones. For active voice, each new digitized value is different than the previous digitized value. During silence, the digitized value is near the center of the 8-bit range, with some slight noise variation. Therefore, audio channels are characterized by the presence of many values having more than five consecutive logical ones, a lack of long runs of identical values, and by long runs of values near the center of the 8-bit range. There are several different types of voice encoding, but they all have similar characteristics.

Another consideration in analyzing channel data is that the data may be preprocessed or encoded in a number of ways. The two simplest methods are for the data to be inverted or encoded. A common encoding is the "Non Return to Zero" (NRZI) format. The detection algorithm must make several data gathering attempts, with the receiving hardware set to receive normal, inverted, or NRZI data. Then, the above algorithms are applied to each data gathering attempt.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. IT is intended that the appended claims be construed to include other alternative embodiment of the invention except insofar as limit by the prior art.

What is claimed is:

1. A method for detecting a fractional channel in a telecommunications circuit, the method comprising the following steps:

(a) identifying a set of channels, each channel in the set having a consecutive series of identical octets, each identical octet containing one of eight possible patterns for an idle flag;

(b) measuring a non-idle data rate, for each channel in the set identified in step (a);

(c) retaining, in the set identified in step (a), each channel having a non-idle data rate that is the same as a non-idle data rate for the other channels in the set, within a permissible range of variation, and eliminating all other channels from the set; and (d) designating the set of channels remaining after step (c) as a fractional channel if at least two channels remain in the set.

2. The method of claim 1, step (a) further comprising eliminating from the set of channels any channel that is identified as a voice channel.

3. A method for detecting a fractional channel in a telecommunications circuit, the method comprising the following steps:

(a) measuring a non-idle data rate for each channel in the telecommunications circuit;

(b) grouping a set of channels having the same non-idle data rate, within a fixed range of variation, into a particular set;

(c) eliminating from the particular set any channel that is identified as a voice channel;

(d) measuring a non-idle data rate, for the particular set, for each channel remaining in the particular set;

(e) retaining, in the particular set, each channel having a non-idle data rate that is the same as a non-idle data rate for the other channels in the particular set, within a permissible range of variation, and eliminating all other channels from the particular set;

(f) repeating steps (d) and (e) multiple times; and (g) designating, as a fractional channel, the channels remaining in the particular set when at least two channels remain.

4. The method of claim 3 further comprising the following step:

(h) identifying a data traffic pattern on a fractional channel designated in step (g) as HDLC or SDLC protocol.

5. The method of claim 4 wherein identifying a data traffic pattern as HDLC or SDLC comprises identifying a series of identical octets, each containing one of eight possible idle flag patterns.

* * * * *